United States Patent
Zhao et al.

(10) Patent No.: US 9,591,542 B2
(45) Date of Patent: Mar. 7, 2017

(54) METHOD, BASE STATION AND SYSTEM FOR RESELECTION OR HANDOVER TO BROADCAST MULTICAST CELL

(71) Applicant: HUAWEI TECHNOLOGIES CO., LTD., Shenzhen (CN)

(72) Inventors: Junhui Zhao, Shenzhen (CN); Qinghai Zeng, Shanghai (CN); Mingzeng Dai, Shanghai (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 94 days.

(21) Appl. No.: 14/175,098

(22) Filed: Feb. 7, 2014

(65) Prior Publication Data
US 2014/0153474 A1    Jun. 5, 2014

Related U.S. Application Data

(63) Continuation of application No. PCT/CN2012/079617, filed on Aug. 3, 2012.

(30) Foreign Application Priority Data

Aug. 12, 2011 (CN) .......................... 2011 1 0231555

(51) Int. Cl.
*H04H 20/71* (2008.01)
*H04W 36/24* (2009.01)
(Continued)

(52) U.S. Cl.
CPC ............ *H04W 36/24* (2013.01); *H04W 4/06* (2013.01); *H04W 36/0083* (2013.01); *H04W 72/02* (2013.01); *H04W 76/002* (2013.01)

(58) Field of Classification Search
CPC ..... H04W 36/24; H04W 4/06; H04W 72/005; H04W 48/12; H04W 36/0083; H04L 65/4076

See application file for complete search history.

(56) References Cited

U.S. PATENT DOCUMENTS

2005/0041608 A1    2/2005   Jeong et al.
2008/0274759 A1   11/2008   Chen et al.
(Continued)

FOREIGN PATENT DOCUMENTS

CN    1738486 A    2/2006
CN    1836387 A    9/2006
(Continued)

OTHER PUBLICATIONS

LTE, "3$^{rd}$ Generational Partnership Project; Technical Specification Group Radio Access Network; Evolved Universal Terrestrial Radio Access (E-UTRA) and Evolved Universal Terrestrial Radio Access Network (E-UTRAN); Overall Description" Stage 2 (Release 10) 3GPP TS 36.300, V10.4.0, Jun. 2011, 194 pages.
(Continued)

*Primary Examiner* — Kiet Tang
(74) *Attorney, Agent, or Firm* — Brinks Gilson & Lione

(57) ABSTRACT

The present invention discloses a method and system for reselecting or handing over to a broadcast multicast cell. The method includes the following steps: broadcasting, by an MBMS cell, a service area identity list of a service area to which the MBMS cell belongs; determining, by a UE, whether the service area identity list includes a service area identity corresponding to a service; if the service area identity list includes service area identity corresponding to the service, setting, by the UE, a cell reselection priority of a frequency of an MBMS cell to the highest. According to the present invention, a UE can identify whether a cell capable of providing services that the UE is receiving or is interested in around the UE, so that the cell can learn which neighboring cells are MBMS cells and what services are being broadcast in MBMS cells if such MBMS cells are available.

13 Claims, 8 Drawing Sheets

(51) Int. Cl.
H04W 4/06 (2009.01)
H04W 36/00 (2009.01)
H04W 72/02 (2009.01)
H04W 76/00 (2009.01)

(56) References Cited

U.S. PATENT DOCUMENTS

| | | | |
|---|---|---|---|
| 2010/0189027 A1 | 7/2010 | Ishida et al. | |
| 2011/0039551 A1 | 2/2011 | Tsuboi et al. | |
| 2011/0149827 A1* | 6/2011 | Na | H04L 12/189 370/312 |
| 2011/0305184 A1* | 12/2011 | Hsu | H04L 65/4076 370/312 |
| 2012/0188930 A1 | 7/2012 | Mao et al. | |
| 2012/0230347 A1 | 9/2012 | Gao et al. | |
| 2012/0236776 A1* | 9/2012 | Zhang | H04W 48/12 370/312 |
| 2014/0044035 A1* | 2/2014 | Hwang | H04W 72/005 370/312 |

FOREIGN PATENT DOCUMENTS

| | | |
|---|---|---|
| CN | 101483809 A | 7/2009 |
| CN | 101568158 A | 10/2009 |
| CN | 102036183 A | 4/2011 |
| CN | 102149044 A | 8/2011 |
| EP | 1509056 A2 | 2/2005 |
| EP | 2 161 862 A1 | 3/2010 |
| JP | 2013-502104 A | 1/2013 |
| JP | 2013-506354 A | 2/2013 |
| WO | WO 2008/155915 A1 | 12/2008 |
| WO | WO 2009/133767 A1 | 11/2009 |
| WO | WO 2011/017912 A1 | 2/2011 |
| WO | WO 2011/038587 A1 | 4/2011 |

OTHER PUBLICATIONS

LTE, "3$^{rd}$ Generation Partnership Project; Technical Specification Group Radio Access Network; Evolved Universal Terrestrial Radio Access (E-UTRA); User Equipment (UE) procedures in idle mode" (Release 10) 3GPPTS 36.304, V10.2.0, Jun. 2011, 33 pages.

LTE, "3rd Generation Partnership Project; Technical Specification Group Radio Access Network; Evolved Universal Terrestrial Radio Access (E-UTRA); Radio Resource Control (RRC); Protocol specification" (Release 10) 3GPP TS 36.331, V10.2.0, Jun. 2011, 294 pages.

LTE, 3$^{rd}$ Generation Partnership Project; Technical Specification Group Radio Access Network; Evolved Universal Terrestrial Radio Access Network (E-UTRAN); X2 application protocol (X2AP) (Release 10) 3GPP TS 36.423, V10.2.0, Jun. 2011, 130 pages.

Huawei et al., "(Re)Selecting appropriate frequency/cell for service continuity" Agenda Item 7.3.2, 3GPP TSG-RAN WG2 Meeting #74, Barcelona, Spain, May 9-13, 2011, 8 pages.

Huawei, "[76#38]—LTE: MBMS Assistance information" Agenda Item 7.3.2, 3GPP TSG-RAN WG2 Meeting #77, Dresden, Germany, Feb. 6-10, 2012, 12 pages.

"3$^{rd}$ Generation Partnership Project; Technical Specification Group Core Network and Terminals; Numbering, addressing and identification (Release 10)," 3GPP TS 23.003, V10.2.0, Jun. 2011, 80 pages.

* cited by examiner

METHOD, BASE STATION AND SYSTEM FOR RESELECTION OR HANDOVER TO BROADCAST MULTICAST CELL

CROSS-REFERENCE TO RELATED APPLICATIONS

This application is a continuation of International Application No. PCT/CN2012/079617, filed on Aug. 3, 2012, which claims priority to Chinese Patent Application No. 201110231555.3, filed on Aug. 12, 2011, both of which are hereby incorporated by reference in their entireties.

FIELD OF THE INVENTION

The present invention relates to communication networks, and in particular, to multimedia broadcast multicast services.

BACKGROUND OF THE INVENTION

A multimedia broadcast multicast service (MBMS, Multimedia Broadcast Multicast Service) is one of the important contents in the development of the Third Generation Partnership Project (3GPP) services. In the MBMS, the network can send the same multimedia data to multiple mobile terminals on the network in broadcast or multicast mode. Compared with a single user transmission mode, the MBMS greatly saves air interface resources of a system. According to the long-term evolution (LTE) MBMS R9 protocols formulated recently, an MBMS service is transmitted over a multimedia broadcast multicast service single frequency network (MBSFN, Multimedia Broadcast multicast service Single Frequency Network). In MBMS transmission mode, an MBMS service is transmitted synchronously at the same frequency in multiple cells at the same time. This transmission mode effectively saves frequency resources, improves spectrum usage rate, and enhance coverage rate.

FIG. 1 illustrates a logical architecture of an MBMS at the side of E-UTRA. MBMS service control signaling is transmitted by an MME (mobility management entity) to eNB through M3 and M2 interfaces, to set up MBMS service sessions and allocate resources synchronously. MBMS service user plane data is transmitted by an MBMS GW (gateway) to the eNB through an M1 interface, and synchronous transmission of the user plane data is implemented over the sync protocol (synchronization protocol).

A multi-cell/multicast coordination entity (MCE, multi-cell/multicast coordination entity) is a logical entity, and can be configured with multiple MBSFN areas (MBSFN Area) used for MBSFN transmissions, and can allocate radio resources to all evolved Node Bs (eNB, evolved Node B) for multi-cell transmissions in the MBSFN areas. One MBSFN area may include multiple eNBs (multiple cells). All cells in the same MBSFN area broadcast the same contents in synchronous mode. Each MBMS service is broadcast in a specific service area (Service Area), and one service area may include multiple MBSFN areas, that is, multiple cells.

The process of broadcasting an MBMS service is as follows: Before the MBMS service is broadcast on the air interface (may be several hours earlier), a UE (user equipment) receives a service description from the application layer, where the service description includes a list of MBMS services to be broadcast and service start time. Before the services are formally broadcast (a duration of several seconds), a cell broadcasts an MCCH (Multicast Control Channel, multicast control channel) change notification (change notification) in a PDCCH (physical downlink control channel, physical downlink control channel) channel. Configuration information about the time of sending the notification is broadcast in a SIB (system information block, system information block) 13. The UE monitors the PDCCH according to the configuration information in the SIB 13; and when reading the MCCH change notification (change notification), the UE reads control information of an MBMS service from the MCCH, and learns which service starts to be broadcast.

For the UE, if the UE is receiving an MBMS service or is interested in an MBMS service, best efforts should be made to ensure that the UE camps on a cell that can provide the corresponding service, so that users can enjoy a better experience.

Therefore, in the prior art, a UE in an idle state that is receiving an MBMS service and is interested in an MBMS service sets the priority of the frequency of the MBMS to the highest, that is, the UE gives a top priority the frequency of the MBMS cell in the case of cell reselection.

SUMMARY OF THE INVENTION

One objective of the present invention is to ensure that UEs in an idle state and in a connected state are able to camp on an MBSFN cell providing services that the UEs are receiving or are interested in.

Another objective of the present invention is to ensure that a UE is able to identify whether there are cells capable of providing services that the UE is receiving or is interested in around the UE.

Another objective of the present invention is to ensure that a UE is able to learn when services that the UE is interested in start to be broadcast.

Another objective of the present invention is to ensure that a cell is able to learn which neighboring cells are MBMS cells and what services these MBMS cells, if available, are broadcasting.

Therefore, a first aspect of the present invention provides a method for reselecting to a broadcast multicast cell. The method includes the following steps: receiving a service area identity list of a service area to which a multimedia broadcast multicast service MBMS cell belongs broadcast by a base station to which the MBMS cell belongs; determining whether the service area identity list includes a service area identity corresponding to an MBMS service that the UE is receiving or is interested in; if the service area identity list includes the service area identity corresponding to the MBMS service that the UE is receiving or is interested in, setting a cell reselection priority of a frequency of the MBMS cell to the highest. A second aspect of the present invention provides a user equipment UE. The UE includes: a service area identity list receiving unit, configured to receive a service area identity list of a service area to which an MBMS cell belongs broadcast by the base station to which the MBMS cell belongs; a judging unit, configured to determine whether the service area identity list includes a service area identity corresponding to an MBMS service that the UE is receiving or is interested in; a setting unit, configured to: if the service area identity list includes the service area identity corresponding to the MBMS service that the UE is receiving or is interested in, set a cell reselection priority of a frequency of the MBMS cell to the highest.

A third aspect of the present invention provides a method for setting a frequency priority for a UE. The method includes the following steps: broadcasting, by a base station to which an MBMS cell belongs, a service area identity list of a service area to which the MBMS cell belongs, so that a UE receives the service area identity list; and when the service area identity list includes a service area identity corresponding to an MBMS service that the UE is receiving or is interested in, setting a cell reselection priority of a frequency of the MBMS cell to the highest.

A fourth aspect of the present invention provides a base station. The base station includes: a broadcasting unit, configured to: broadcast a service area identity list of a service area to which an MBMS cell of the base station belongs, so that a UE receives the service area identity list; and when the service area identity list includes a service area identity corresponding to an MBMS service that the UE is receiving or is interested in, set a cell reselection priority of a frequency of the MBMS cell to the highest.

A fifth aspect of the present invention provides a communication system, where the communication system includes a UE and a base station.

A sixth aspect of the present invention provides a method for handing over to a broadcast multicast cell. The method includes the following steps: receiving, by a base station to which an MBMS cell belongs, a service area identity of an MBMS service and a service identity of the MBMS service from a multi-cell/multicast coordination entity MCE; sending, by the base station to which the MBMS cell belongs, the service identity of the MBMS service to a non-MBMS neighboring cell of the MBMS cell or a neighboring cell that do not belongs to a service area of the MBMS service, so that when a base station to which a serving cell of the UE belongs receives the service identity of the MBMS service and determines that the service identity of the MBMS service belongs to an MBMS service that the UE is receiving or is interested in, the base station to which the serving cell of the UE belongs hands over the UE to the MBMS cell.

A seventh aspect of the present invention provides a base station. The base station includes: a receiving unit, configured to receive a service area identity of an MBMS service and a service identity of the MBMS service from an MCE; and a sending unit, configured to send the service identity of the MBMS service to a non-MBMS neighboring cell of the MBMS cell or a neighboring cell that do not belongs to a service area of the MBMS service, so that when a base station to which a serving cell of the UE belongs receives the service identity of the MBMS service and the service identity of the MBMS service belongs to an MBMS service that the UE is receiving or is interested in, the base station to which the serving cell of the UE belongs hands over the UE to the MBMS cell.

An eighth aspect of the present invention provides a method for handing over a UE to a broadcast multicast cell. The method includes the following steps: receiving, by a base station to which a serving cell of a UE belongs, a service identity of an MBMS service from a base station to which a neighboring cell of the serving cell of the UE belongs, where the serving cell of the UE is a non-MBMS cell or an MBMS cell not belonging to a service area of the MBMS service; determining, by the base station to which the serving cell of the UE belongs, whether the MBMS service belongs to an MBMS service that the UE is receiving or is interested in according to the service identity of the MBMS service; handing over, by the base station to which the serving cell of the UE belongs, the UE to the MBMS cell when the MBMS service belongs to the MBMS service that the UE is receiving or is interested in.

A tenth aspect of the present invention provides a base station. The base station includes: a receiving unit, configured to receive a service identity of an MBMS service from a base station to which neighboring cells of a serving cell of a UE belongs, where the serving cell of the UE is a non-MBMS cell or an MBMS cell not belonging to a service area of the MBMS service; a judging unit, configured to determine whether the MBMS service belongs to an MBMS service that the UE is receiving or is interested in according to the service identity of the MBMS service; and a handover unit, configured to hand over the UE to the MBMS cell when the MBMS service belongs to the MBMS service that the UE is receiving or is interested in.

An eleventh aspect of the present invention provides a method for determining whether an MBMS service that a UE is receiving or is interested in starts to be broadcast. The method includes the following steps: when configuration information of an MCCH change notification of an MBMS cell is changed, sending, by the MBMS cell, an indication indicating that the configuration information of the MCCH change notification of the MBMS cell is changed to a neighboring cell; broadcasting, by the neighboring cell, the indication indicating that the configuration information of the MCCH change notification of the MBMS cell is changed; when a UE camping on the neighboring cell receives the indication indicating that the configuration information of the MCCH change notification of the MBMS cell is changed, reading, by the UE, the configuration information of the MCCH change notification of the MBMS cell; monitoring the MCCH change notification in a PDCCH channel of the MBMS cell according to the configuration information of the MCCH change notification of the MBMS cell; when the MCCH change notification of the MBMS cell is detected, reading an MCCH of the MBMS cell, to determine whether the MBMS service that the UE is receiving or is interested in starts to be broadcast.

A twelfth aspect of the present invention provides a method for determining whether an MBMS service that a UE is receiving or is interested in starts to be broadcast. The method includes: sending, by an MBMS cell, configuration information of an MCCH change notification and the MCCH change notification of the MBMS cell to a neighboring cell; broadcasting, by the neighboring cell, the configuration information of the MCCH change notification of the MBMS cell, and broadcasting the MCCH change notification of the MBMS cell in a PDDCH of the neighboring cell according to the configuration information of the MCCH change notification of the MBMS cell; receiving, by a UE camping on the neighboring cell, the configuration information of the MCCH change notification of the MBMS cell, and monitoring the MCCH change notification of the MBMS cell broadcast in a PDCCH of cells where the UE camps on (that is, the neighboring cell of the MBMS cell) according to the configuration information of the MCCH change notification of the MBMS cell, to determine whether the MCCH of the MBMS cell is changed; when the MCCH of the MBMS cell is changed, reading the MCCH of the MBMS cell according to the detected MCCH change notification of the MBMS cell, to determine whether an MBMS service that the UE is receiving or is interested in starts to be broadcast.

One objective of the present invention is to ensure that a UE in an idle state or in a connected state is able to camp on an MBSFN cell providing services that the UE is receiving or is interested in.

BRIEF DESCRIPTION OF THE DRAWINGS

The following describes specific implementation solutions of the present invention in more detail with reference to the accompanying drawings, where.

DETAILED DESCRIPTION OF THE EMBODIMENTS

The following embodiments describe how to ensure that a UE in an idle state or in a connected state is able to camp on an MBSFN cell providing services that the UE is receiving or is interested in. The first embodiment to the tenth embodiment are based on a UE in an idle state, while the eleventh embodiment to the thirteenth embodiment are based on a UE in a connected state.

Figure 1:
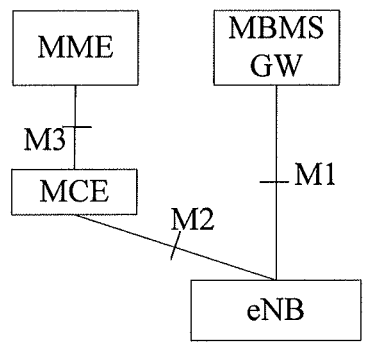
FIG. 1 illustrates a logical structure of an MBMS at the side of an E-UTRA.
Figure 2:
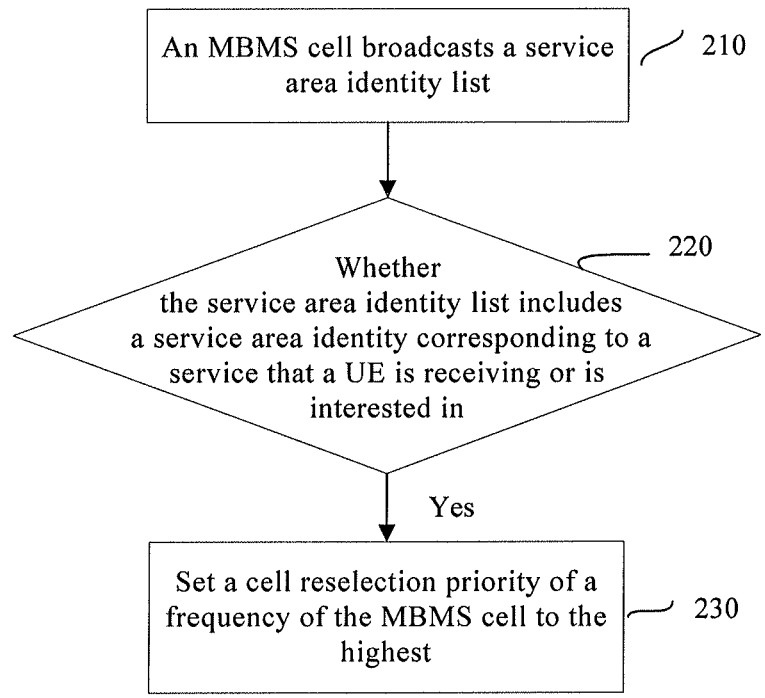
FIG. 2 is a schematic flowchart of a method according to a first embodiment of the present invention.

FIG. 2 is a schematic flowchart of a method according to a first embodiment of the present invention.

In step 210, an MBMS cell (a cell belonging to any MBMS service area) broadcasts a service area identity list of a service area to which the MBMS cell belongs.

The service area identity list may be broadcast through a system message of the MBMS cell. It should be noted that information or a message received or sent by a cell in the specifications is actually information or a message received or sent by a base station to which the cell belongs.

In step 220, a UE receives the service area identity list and determines whether the service area identity list includes a service area identity corresponding to an MBMS service that the UE is receiving or is interested in.

In this step, the UE may determine whether an MBMS service that the UE is receiving or is interested in can be broadcast in a local cell (a serving cell of the UE) or neighboring cell by reading a system message of the local cell and the neighboring cell and determining whether the system message include a service area identity list and whether the service area identity list includes a service area identity corresponding to a service that the UE is interested in. The UE may receive a service description from the application layer in advance, where the service description indicates service area identities corresponding to each MBMS service.

If the serving cell or a neighboring cell can provide an MBMS service that the UE is receiving or is interested in, in step 230, the UE may set a cell reselection priority of a frequency of the MBMS cell to the highest.

It is understandable that in other embodiments, the UE can set a cell reselection priority of a frequency of the MBMS cell to the highest when determining that the serving cell or a neighboring cell can provide an MBMS service that the UE is receiving or is interested in, or set a cell reselection priority of the frequency of the MBMS cell to the highest only when the MBMS service that the UE is receiving or is interested in starts to be broadcast. Certainly, the step of setting the cell reselection priority of the frequency of the MBMS cell to the highest may also be performed when a signal of the MBMS cell is better than or exceed a threshold.

When the UE camps on an MBMS cell sending the service area identity list (that is, the MBMS cell is the serving cell or local cell of the UE), the UE can monitor an MCCH change notification message (hereinafter referred to as an MCCH change notification) in a PDCCH channel of the MBMS cell, and when the MCCH change notification is detected, read the MCCH to determine that the MBMS service that the UE is receiving or is interested in starts to be broadcast. However, when the UE does not camp on the MBMS cell sending the service area identity list (that is, the MBMS cell is a neighboring cell of the serving cell of the UE), the UE is difficult to keep monitoring the PDCCH channel of the MBMS cell. In this case, the following two methods may be used to determine whether a service that the UE is receiving or is interested in starts to be broadcast.

It is assumed that a cell A is an MBMS cell, a cell B is a neighboring cell of the cell A, and the UE currently camps on the cell B. In a first example, when the configuration information of the MCCH change notification of the cell A is changed, the cell A may send an indication indicating the configuration information of the MCCH change notification of the cell A is changed to the cell B through interface signaling (for example, X2 interface signaling). It is understandable that the cell A may send an indication indicating the configuration information of the MCCH change notification of the cell A is changed to a neighboring cell other than the cell B. After receiving the indication, the cell B may broadcast the indication to the UE camping on the cell B. When the UE receives the indication, the UE can monitor the MCCH change notification in the PDCCH channel of the cell A; when the MCCH change notification is detected, the UE reads the MCCH, and then can determine which MBMS service that the UE is receiving or is interested in starts to be broadcast.

In a second example, the cell A sends the configuration information of the MCCH change notification and the MCCH change notification of the cell A to the cell B through X2 interface signaling. It is understandable that the cell A may also send the configuration information of the MCCH change notification and the MCCH change notification of the cell A to a neighboring cell other than the cell B. The cell B may broadcast the configuration information of the MCCH change notification of the cell A in a SIB 13, and broadcast the MCCH change notification of the cell A in the PDCCH channel of the cell B. When the UE camping on the cell B receives the configuration information of the MCCH change notification of the cell A from the cell B, if monitoring the MCCH change notification of the cell A in the PDCCH channel of the cell B according to the configuration information, the UE can learn whether the MCCH of the cell A is changed. When learning that the MCCH of the cell A is changed, the UE reads the MCCH of the cell based on the detected MCCH change notification of the cell A, to learn which MBMS service that the UE is receiving or is interested in starts to be broadcast.

Figure 3:
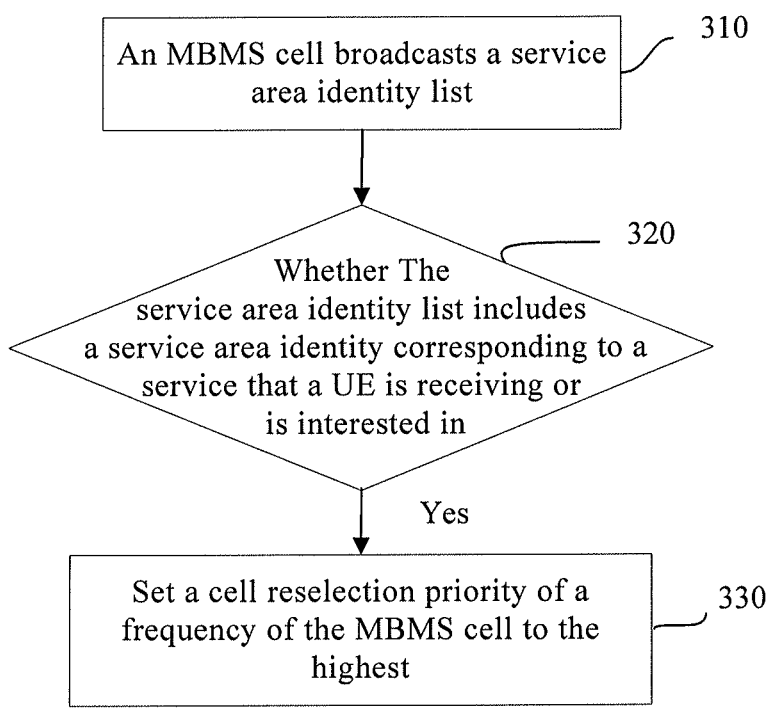
FIG. 3 is a schematic flowchart of a method according to a second embodiment of the present invention.

FIG. 3 is a schematic flowchart of a method according to a second embodiment of the present invention. Step 310 and step 320 in the second embodiment are basically the same as step 210 and step 220 in the first embodiment. The second embodiment is different from the first embodiment in step 330, that is, if the MBMS cell can provide an MBMS service that the UE is receiving or is interested in, the UE can immediately set the cell reselection priority of the frequency of the MBMS cell to the highest.

Figure 4:
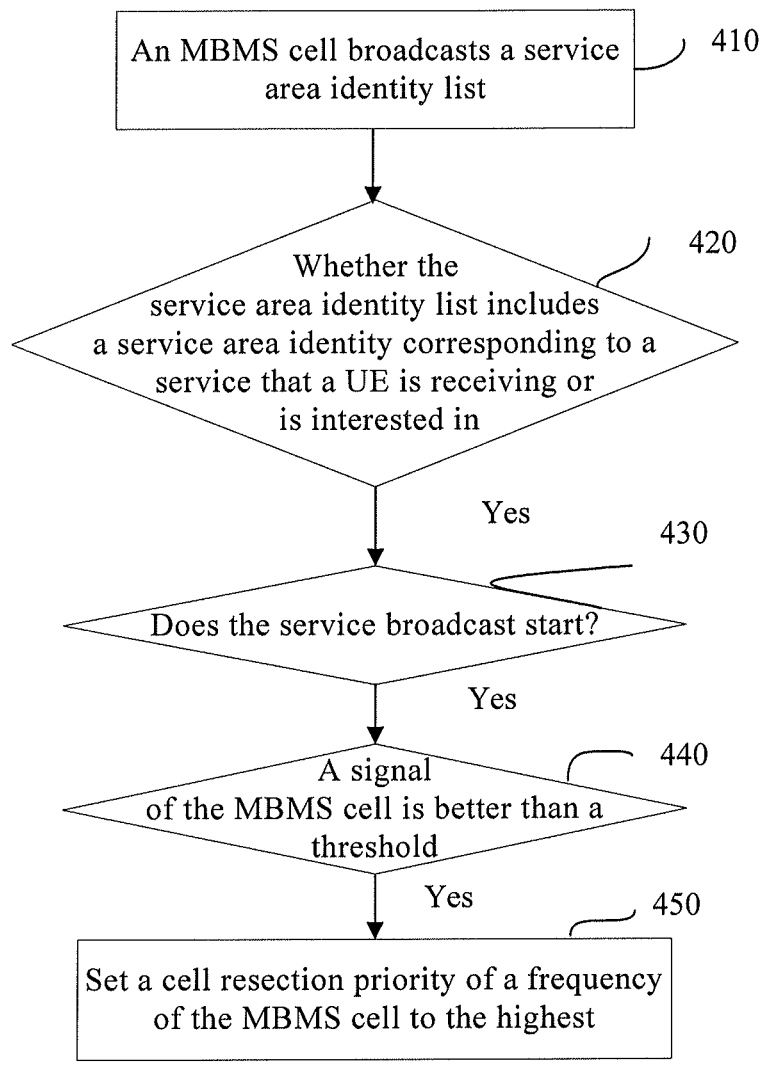
FIG. 4 is a schematic flowchart of a method according to a third embodiment of the present invention.

FIG. 4 is a schematic flowchart of a method according to a third embodiment of the present invention. On the basis of the first embodiment, the UE sets the cell reselection priority of the frequency of the MBMS cell to the highest only when a signal of the MBMS cell of an MBMS service that the UE is receiving or is interested in is better than a threshold.

Specifically, step 410 and step 420 in the third embodiment are basically the same as step 210 and step 220 in the first embodiment. The third embodiment is different from the first embodiment in subsequent steps.

In step 430, the UE determines whether the MBMS service that the UE is receiving or is interested in starts to be broadcast. The determining method may be the same as that in the first embodiment. When the MBMS service that the UE is receiving or is interested in starts to be broadcast, step 440 is performed.

In step 440, the UE determines whether a signal of the MBMS cell is better than a threshold. If the signal of the MBMS cell is better than the threshold, in step 450, the UE sets a cell reselection priority of the frequency of the MBMS cell to the highest.

Certainly, the sequence of step 430 and step 440 is not limited herein.

Figure 5:
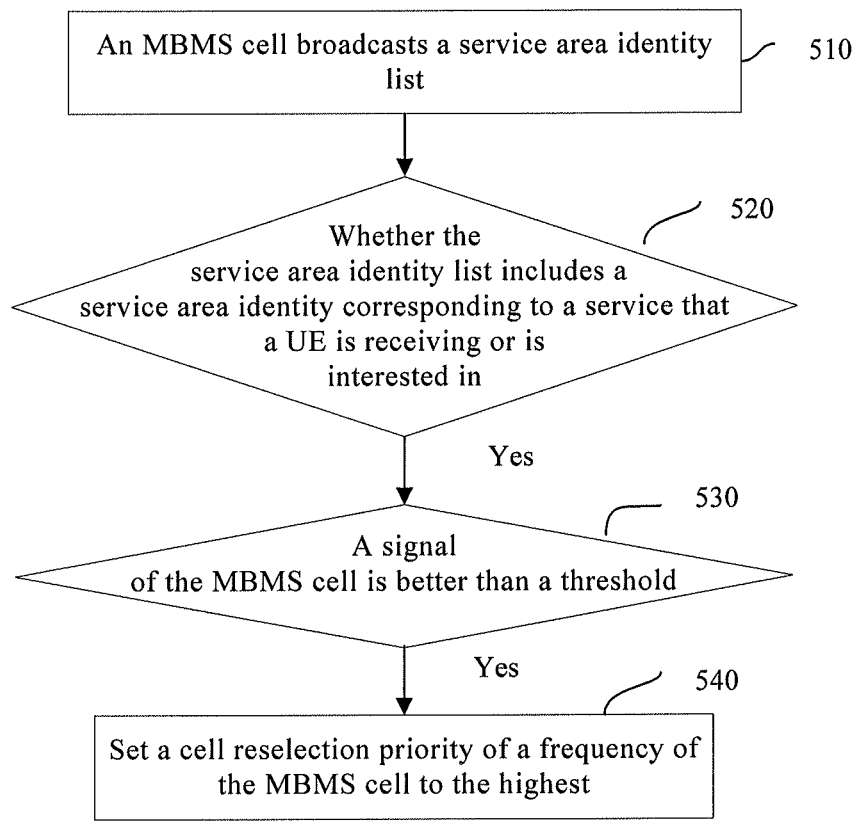
FIG. 5 is a schematic flowchart of a method according to a fourth embodiment of the present invention.

FIG. 5 is a schematic flowchart of a method according to a fourth embodiment of the present invention. On the basis of the second embodiment, the UE sets the cell reselection priority of the frequency of the MBMS cell to the highest only when a signal of the MBMS cell is better than a threshold.

Specifically, step 510 and step 520 in the fourth embodiment are basically the same as step 310 and step 320 in the second embodiment. The fourth embodiment is different from the second embodiment in the subsequent step.

In step 530, the UE determines whether the signal of the MBMS cell is better than a threshold. If the signal of the MBMS cell is better than the threshold, in step 540, the UE sets a cell reselection priority of the frequency of the MBMS cell to the highest.

Figure 6:
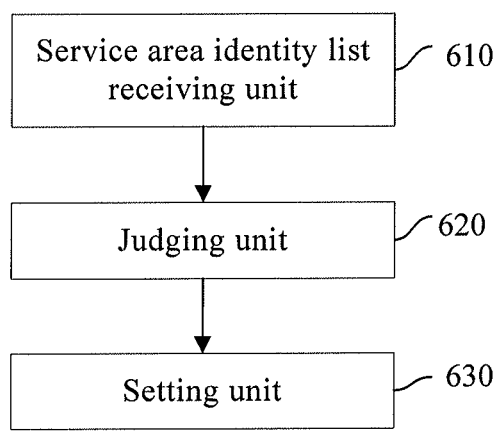
FIG. 6 is a block diagram of a UE according to a fifth embodiment of the present invention.

FIG. 6 is a block diagram of a UE according to a fifth embodiment of the present invention. As shown in FIG. 6, the UE includes: a service area identity list receiving unit 610, configured to receive a service area identity list of a service area to which an MBMS cell belongs broadcast by the MBMS cell; a judging unit 620, configured to determine whether the service area identity list includes a service area identity corresponding to an MBMS service that the UE is receiving or is interested in; a setting unit 630, configured to: if the service area identity list includes the service area identity corresponding to the MBMS service that the UE is receiving or is interested in, set a cell reselection priority of a frequency of the MBMS cell to the highest.

For example, the setting unit 620 executes the step of setting the cell reselection priority of the frequency of the MBMS cell to the highest when a signal of the MBMS cell is better than a threshold or when the MBMS service that the UE is receiving or is interested in is started. Certainly, the setting unit 620 may also set the cell reselection priority of the frequency of the MBMS cell to the highest immediately when the judging unit 620 determines that the service area identity list includes the service area identity corresponding to the MBMS service that the UE is receiving or is interested in.

Further, when the MBMS cell is a cell where the UE camps on, the UE further includes: a monitoring unit, configured to monitor an MCCH change notification in a PDCCH of the MBMS cell; a reading unit, configured to read the MCCH when the MCCH change notification is detected; and a determining unit, configured to determine, according to the read MCCH, whether the MBMS service that the UE is receiving or is interested in starts to be broadcast.

Further, when the MBMS cell is a neighboring cell of the serving cell of the UE, the UE further includes: a receiving unit, configured to receive an indication indicating that configuration information of the MCCH change notification of the MBMS cell is changed sent by a base station to which the MBMS cell belongs through an interface between the base station to which the MBMS cell belongs and a base station to which the serving cell of the UE belongs; a reading unit, configured to read the configuration information of the MCCH change notification of the MBMS cell according to the indication indicating that the configuration information of the MCCH change notification of the MBMS cell is changed; a monitoring unit, configured to monitor the MCCH change notification in a PDCCH channel of the MBMS cell according to the configuration information of the MCCH change notification of the MBMS cell; and a determining unit, configured to: when the MCCH change notification of the MBMS cell is detected, read the MCCH of the MBMS cell, so as to determine whether the MBMS service starts to be broadcast.

In another example, when the MBMS cell is a neighboring cell of the serving cell of the UE, the UE further includes: an obtaining unit, configured to obtain configuration information of an MCCH change notification of the MBMS cell broadcast by a base station to which the serving cell of the UE belongs; a first determining unit, configured to monitor the MCCH change notification of the MBMS cell broadcast in a PDCCH channel of the serving cell according to the configuration information of the MCCH change notification of the MBMS cell, so as to determine whether the MCCH of the MBMS cell is changed; and a second determining unit, configured to: when determining that the MCCH of the MBMS cell is changed, read the MCCH of the MBMS cell according to the detected MCCH change notification of the MBMS cell, so as to determine whether the MBMS service starts to be broadcast. The base station to which the serving cell of the UE belongs receives the configuration information of the MCCH change notification of the MBMS cell and the MCCH change notification of the MBMS cell through an interface between the base station to which the serving cell of the UE belongs and the base station to which the MBMS cell belongs; and the MCCH change notification of the MBMS cell is broadcast to the UE through the PDCCH channel of the serving cell of the UE. In this way, the UE can learn, by monitoring the PDCCH channel of the serving cell, whether the MCCH of neighboring cell is changed and determine whether the MBMS service in the neighboring cell starts to be broadcast.

It is understandable that the UE in this embodiment can be configured to execute the embodiment illustrated in FIG. 2. Therefore, for details about contents not mentioned in this embodiment, reference may be made to the description of the embodiment illustrated in FIG. 2.

Figure 7:
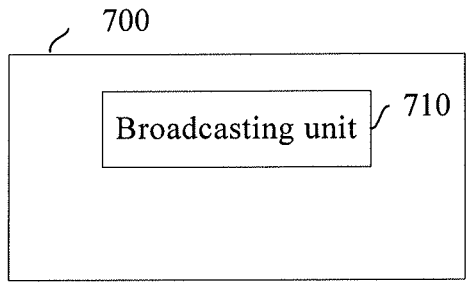
FIG. 7 is a block diagram of a base station according to a fifth embodiment of the present invention.

FIG. 7 is a schematic structural diagram of a base station according to a fifth embodiment of the present invention. The base station 700 includes: a broadcasting unit 710, configured to broadcast a service area identity list of a service area to which the MBMS cell of the base station belongs, so that a UE receives the service area identity list, and sets a cell reselection priority of a frequency of the MBMS cell to the highest when the service area identity list includes a service area identity corresponding to an MBMS service that the UE is receiving or is interested in.

Further, when the MBMS cell is a neighboring cell of the serving cell of the UE, the base station 700 may further include: a sending unit, configured to send an indication indicating that configuration information of an MCCH change notification of the MBMS cell is changed to a base station to which the serving cell of the UE belongs through an interface between the base station and the base station to which the serving cell of the UE belongs, so that the UE obtains, through the base station to which the serving cell of the UE belongs, the indication indicating that the configuration information of the MCCH change notification of the MBMS cell is changed, reads the configuration information of the MCCH change notification of the MBMS cell according to the indication indicating that the configuration information of the MCCH change notification of the MBMS cell is changed, and monitors the MCCH change notification in a PDCCH channel of the MBMS cell according to the configuration information of the MCCH change notification of the MBMS cell, and when the MCCH change notification of the MBMS cell is detected, reads the MCCH of the MBMS cell to determine whether the MBMS service that the UE is receiving or is interested in starts to be broadcast; and when determining that the MBMS service that the UE is receiving or is interested in starts to be broadcast, the UE sets the cell reselection priority of the frequency of the MBMS cell to the highest. The interface between the base station 700 and the base station to which the serving cell of the UE belongs is an X2 interface.

In another example, when the MBMS cell is a neighboring cell of the serving cell of the UE, the base station 700 may further include: a sending unit, configured to: send configuration information of an MCCH change notification of the MBMS cell and the MCCH change notification of the MBMS cell to a base station to which the serving cell of the UE belongs through an interface between the base station to which the MBMS cell belongs and the base station to which the serving cell of the UE belongs, so that the UE obtains, through the base station to which the serving cell of the UE belongs, the configuration information of the MCCH change notification of the MBMS cell; monitors the MCCH change notification of the MBMS cell broadcast in a PDCCH channel of the serving cell of the UE according to the configuration information of the MCCH change notification of the MBMS cell, to determine whether the MCCH of the MBMS cell is changed; when determining that the MCCH of the MBMS cell is changed, the UE reads the MCCH of the MBMS cell according to the detected MCCH change notification of the MBMS cell, to determine whether the MBMS service that the UE is receiving or is interested in starts to be broadcast; and when determining that the MBMS service that the UE is receiving or is interested in starts to be broadcast, the UE sets the cell reselection priority of the frequency of the MBMS cell to the highest.

Further, when the MBMS cell is a cell where the UE camps on, the base station 700 may further include: a sending unit, configured to send an MCCH change notification to the UE through the PDCCH channel of the MBMS cell, so that the UE reads the MCCH of the MBMS cell according to the MCCH change notification, to determine whether the MBMS service that the UE is receiving or is interested in starts to be broadcast; and when determining that the MBMS service that the UE is receiving or is interested in starts to be broadcast, the UE sets the cell reselection priority of the frequency of the MBMS cell to the highest.

In a seventh embodiment to a tenth embodiment, the UE determines when an MBMS service that the UE is receiving or is interested in starts to be broadcast, and then sets the cell reselection priority of the frequency of a cell providing the MBMS service that the UE is receiving or is interested in to the highest.

Figure 8:
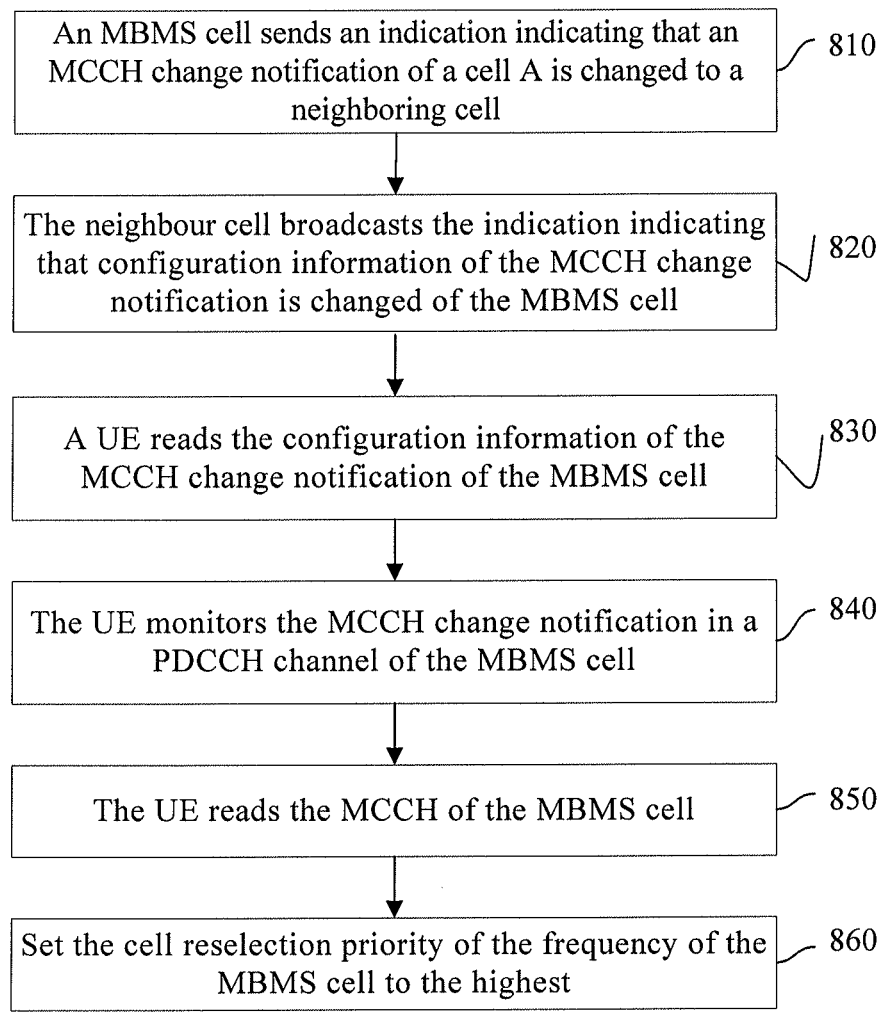
FIG. 8 is a schematic diagram according to a seventh embodiment of the present invention.

FIG. 8 is a schematic diagram according to a seventh embodiment of the present invention. In this embodiment, a cell A is an MBMS cell, a cell B is a neighboring cell of the cell A, and the cell B may be an MBMS cell or a non-MBMS cell. In step 810, when configuration information of an MCCH change notification of the cell A is changed, the cell A sends an indication indicating that the MCCH change notification of the cell A is changed to the cell B through X2 signaling. It is understandable that the cell A may also send the indication indicating the configuration information of the MCCH change notification of the cell A is changed to a neighboring cell other than the cell B. In step 820, the cell B broadcasts the indication indicating that the MCCH change notification is changed received from the cell A. When a UE camps on the cell B obtains the indication indicating that the MCCH change notification is changed broadcast by the cell B, in step 830, the UE reads the configuration information of the MCCH change notification of the cell A. In step 840, the UE monitors the MCCH change notification in a PDCCH channel of the cell A according to the configuration information of the MCCH change notification of the cell A. In step 850, when the UE monitors the MCCH change notification of the cell A, the UE reads the MCCH of the cell A, and then can determine which MBMS service that the UE is receiving or is interested in starts to be broadcast. Further, in step 860, when the MBMS service that the UE is receiving or is broadcast starts to be broadcast in the cell A, the UE sets a cell reselection priority of the frequency of the cell A to the highest, and can start a cell selection process according to the quality of cell signals.

Figure 9:
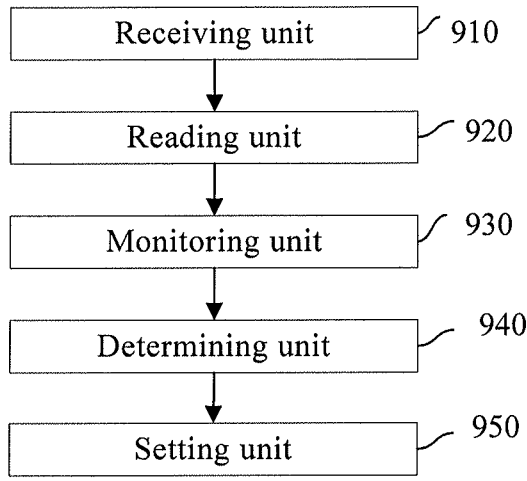
FIG. 9 is a schematic diagram according to an eighth embodiment of the present invention.

FIG. 9 is a schematic diagram according to an eighth embodiment of the present invention. As shown in FIG. 9, the UE provided in the eighth embodiment includes a receiving unit 910, configured to: receive an indication indicating that configuration information of an MCCH change notification of an MBMS cell is changed, where the MBMS cell is a neighboring cell of a cell where the UE camps on; a reading unit 920, configured to read the configuration information of the MCCH change notification of the MBMS cell; a monitoring unit 930, configured to monitor the MCCH change notification in the PDCCH channel of the MBMS cell; and a determining unit 940, configured to: when the MCCH change notification of the MBMS cell is detected, read the MCCH of the MBMS cell, so as to determine whether an MBMS service that the UE is receiving or is interested in starts to be broadcast. Further, the UE may further include a setting unit 950 configured to: when the MBMS service that the UE is receiving or is interested in starts to be broadcast in a cell A, set a cell reselection priority of the frequency of the cell A to the highest.

Figure 10:
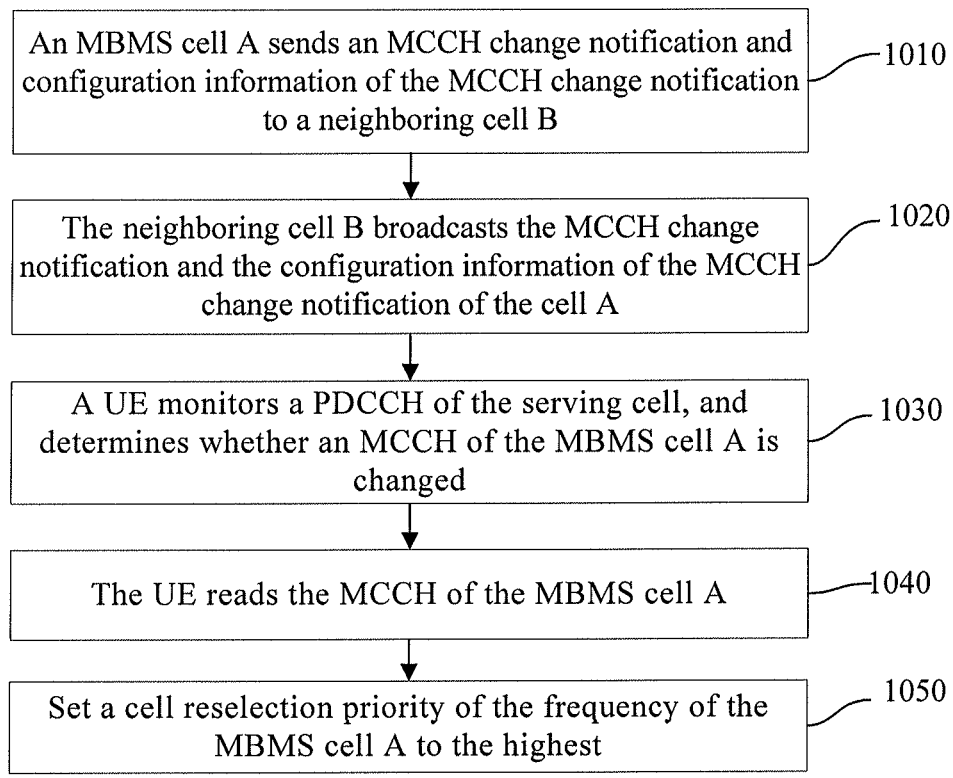
FIG. 10 is a schematic diagram according to a ninth embodiment of the present invention.

FIG. 10 is a schematic diagram according to a ninth embodiment of the present invention. In this embodiment, a cell A is an MBMS cell, a cell B is a neighboring cell of the cell A, and the cell B may be an MBMS cell or a non-MBMS cell. In step 1010, the cell A sends configuration information of an MCCH change notification and the MCCH change notification of the cell A to the cell B through interface signaling (for example, X2 interface signaling). It is understandable that the cell A may also send the configuration information of the MCCH change notification and the MCCH change notification of the cell A to a neighboring cell other than the cell B. In step 1020, the cell B broadcasts the configuration information of the MCCH change notification of the cell A, and broadcasts the MCCH change notification of the cell A in the PDCCH channel of the cell B. In step 1030, a UE camping on the cell B receives the configuration information of the MCCH change notification of the cell A from the cell B, and monitors, according to the configuration information of the MCCH change notification of the cell A, the MCCH change notification of the cell A broadcast in the PDCCH of the cell B, to determine whether the MCCH of the cell A is changed. In step 1040, when determining that the MCCH of the cell A is changed, the UE reads the MCCH of the cell A according to the detected MCCH change notification, to determine whether an MBMS service that the UE is receiving or is interested in starts to be broadcast. Further, in step 1050, when the MBMS service that the UE is receiving or is interested starts to be broadcast in the cell A, the UE sets a cell reselection priority of the frequency of the cell A to the highest, and starts a cell selection process according to the quality of cell signals.

Figure 11:
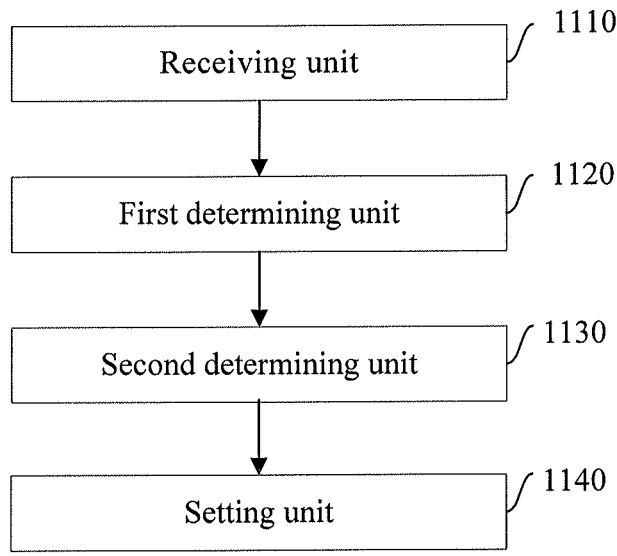
FIG. 11 is a schematic diagram of a UE according to a tenth embodiment of the present invention.

FIG. 11 is a schematic diagram of a UE according to a tenth embodiment of the present invention. The UE includes: a receiving unit 1110, configured to receive configuration information of an MCCH change notification from an MBMS cell; a first determining unit 1120, configured to monitor the PDCCH of the serving cell of the UE according to the configuration information of the MCCH change notification of the MBMS cell, so as to determine whether the MCCH of the MBMS cell is changed; and a second determining unit 1130, configured to: when it is determined that the MCCH of the MBMS cell is changed, read the MCCH of the MBMS cell according to the detected MCCH change notification, so as to determine whether an MBMS service that the UE is receiving or is interested in starts to be broadcast.

Further, the UE may further include a setting unit 1140 configured to: when the MBMS service that the UE is receiving or is interested in starts to be broadcast in the MBMS cell, set the cell reselection priority of the frequency of the MBMS cell to the highest. The MBMS cell may be the serving cell or a neighboring cell of the UE. When the MBMS cell is a neighboring cell of the serving cell of the UE, the MBMS cell sends the configuration information of the MCCH change notification and the MCCH change notification of the MBMS cell to the serving cell of the UE; the serving cell of the UE broadcasts the configuration information of the MCCH change notification of the MBMS cell, and broadcasts the MCCH change notification of the MBMS cell in the PDDCH of the serving cell of the UE according to the configuration information of the MCCH change notification of the MCCH cell.

Figure 12:
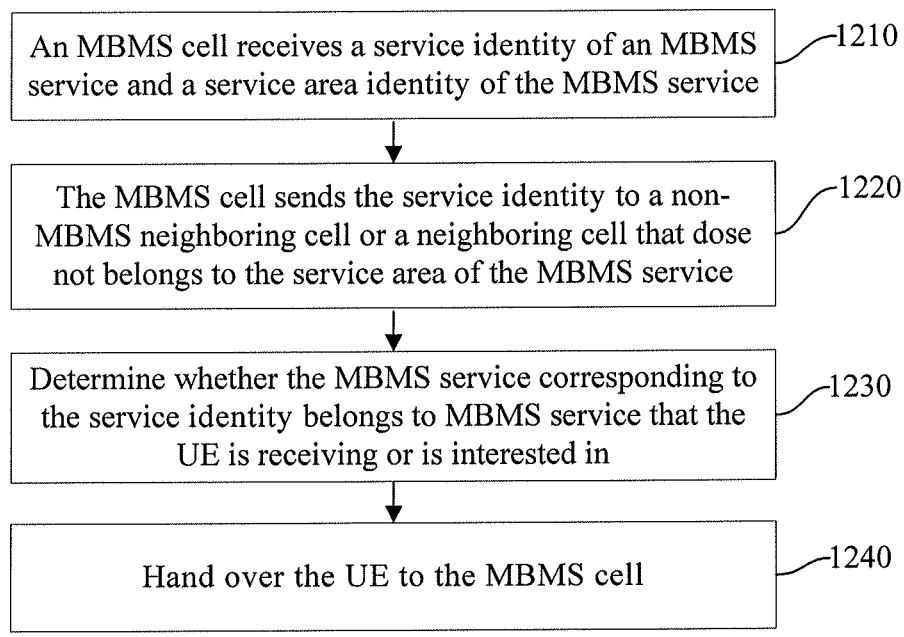
FIG. 12 is a schematic diagram according to an eleventh embodiment of the present invention.

FIG. 12 is a schematic diagram according to an eleventh embodiment of the present invention.

In step 1210, an MBMS cell A receives a service identity of an MBMS service and a service area identity of the MBMS service from an MCE. The service identity and the service area identity may be carried in session start (session start) message sent from the MCE.

In step 1220, the MBMS cell A sends the received service identity to a non-MBMS neighboring cell or a neighboring cell that does not belong to the service area of the MBMS service according to the service area identity, to inform the non-MBMS neighboring cell or the neighboring cell that does not belong to the service area of the MBMS service of a message that the MBMS cell A will broadcast a service indicated by the service identity. The neighboring cell that does not belong to the service area of the MBMS service refer to which a neighboring cell whose service area identity list does not include the service area identity of the MBMS service.

Further, the MBMS cell A can send the cell identifier of the MBMS cell A to the neighboring cell while sending the service identity or by using other modes. In an example, the base station to which the MBMS cell A belongs can determine a neighboring cell that does not belong to the service area of the MBMS service according to the service area identity list of the service area to which the of the MBMS cell A belongs.

To determine whether the neighboring cell is a MBMS cell or whether the service area identity list of the neighboring cell includes the service area identity of the MBMS service, neighboring base stations (for example, the eNB) can exchange lists of service area identity of their respective MBMS service areas in advance through an interface (for example, an X2 interface) signaling between the neighboring base stations. Based on these lists, the base station can determine whether the neighboring cell is an MBMS cell and whether the service area identity list of the neighboring cell include the service area identity of the MBMS service. In an example, the base station can determine whether the neighboring cell is an MBMS cell according to whether the service area identity list is null.

In step 1230, when receiving the service identity, the serving cell B of the UE determines whether the MBMS service corresponding to the service identity received from a neighboring cell (that is, the MBMS cell A) belongs to an MBMS service that the UE is receiving or is interested in. In this embodiment, the serving cell B of the UE is a neighboring cell of the MBMS cell A.

In step 1240, when handing over the UE, the serving cell B of the UE can preferentially hand over the UE to a neighboring cell (the MBMS cell A in this embodiment) capable of providing a service that the UE is receiving or is interested in. It is understandable that when the serving cell B decides to which neighboring cell the UE is handed over, the serving cell B may refer to multiple factors. In this embodiment, "preferentially" means that when other reference factors are the same or basically same, the serving B preferentially hands over the UE to a neighboring cell capable of providing a service that the UE is receiving or is interested in.

Figure 13:
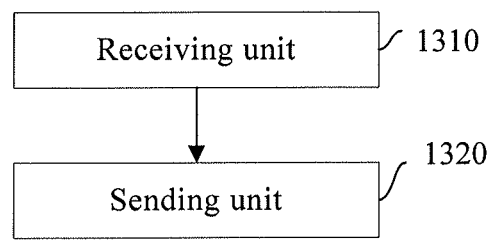
FIG. 13 is a block diagram of a base station according to a twelfth embodiment of the present invention.

FIG. 13 is a schematic structural diagram of a base station according to a twelfth embodiment of the present invention. The base station includes: a receiving unit 1310, configured to receive service area identity and a service identity of an MBMS service from an MCE; and a sending unit 1320, configured to send the service identity of the MBMS service to a non-MBMS neighboring cell of the MBMS cell of the base station or a neighboring cell that does not belong to a service area of the MBMS service, so that when the serving cell of the UE receives the service identity of the MBMS service and determines, according to the service identity of the MBMS service, that the MBMS service belongs to an MBMS service that the UE is receiving or is interested in, the serving cell of the UE hands over the UE to the MBMS cell of the base station.

Further, the base station may further include a unit configured to obtain a service area identity list of a service area to which a neighboring cell of the MBMS cell belongs through X2 interface signaling. Further, the base station may further include a unit configured to determine a non-MBMS neighboring cell of the MBMS cell according to the service area identity list of the service area to which the neighboring cell of the MBMS cell belongs. Further, the base station may further include a determining unit configured to determine a neighboring cells that does not belong to the service area of the MBMS service according to the service area identity list of the service area to which the neighboring cell of the MBMS cell belongs.

It is understandable that the service area identity of the MBMS service and the service identity of the MBMS service may be included in a session start message that the MCE sends to the base station to which the MBMS cell belongs.

Figure 14:
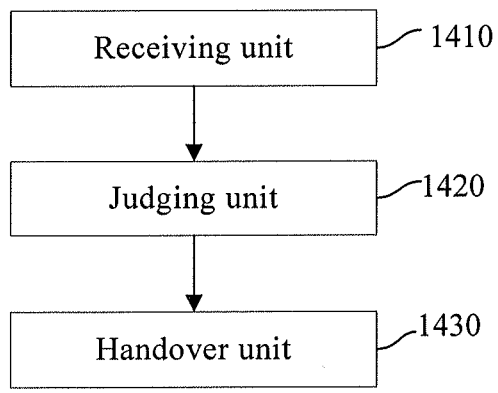
FIG. 14 is a block diagram of a base station according to a thirteenth embodiment of the present invention.

FIG. 14 is a schematic diagram of a base station according to a thirteenth embodiment of the present invention. The base station may include: a receiving unit 1410, configured to receive a service identity of an MBMS service from a neighboring cell of the serving cell of a UE, where the serving cell of the UE is a non-MBMS cell or an MBMS cell not belonging to a service area of the MBMS service; a judging unit 1420, configured to determine, according to the service identity, whether the MBMS service belongs to an MBMS service that the UE is receiving or is interested in; and a handover unit 1430, configured to: when the MBMS service corresponding to the service identity belongs to the MBMS service that the UE is receiving or is interested in, hand over the UE to the MBMS cell.

Further, the serving cell of the UE may further include a unit configured to send a service area identity list of a service area to which the serving cell of the UE belongs to a base station to which the neighboring cell of the serving cell of the UE belongs.

According to the present invention, a UE that is receiving an MBMS service or is interested in an MBMS service is able to set a cell reselection priority of a frequency of an MBMS cell to the highest only when there is a cell capable of providing corresponding services around the UE. In this way, unnecessary cell reselections of the UE can be avoided, and unnecessary loads in unicast cells and cells that cannot provide corresponding services at the MBMS frequency can be avoided.

According to the present invention, the UE is able to learn when services that the UE is interested in are broadcast in a neighboring cell, to reselect to a corresponding cell when corresponding services starts to be broadcast, thereby avoiding adding network loads to the corresponding cell too early.

According to the present invention, a cell is able to learn what services a neighboring MBMS cell is broadcasting, so that UEs interested in these services can be handed over to the cell, thereby providing a better user experience.

It should be noted that although the UE in an idle state that is receiving an MBMS service and is interested in an MBMS service sets the cell reselection priority of the frequency of the cell providing the MBMS service to the highest, the highest priority has only relative meaning. In a particular case, the highest priority may refer to a relatively high priority.

It is apparent that various modifications may be made to the present invention described herein without departing from the spirit and scope of the present invention. Therefore, obvious modifications made by those skilled in the art should be included in the scope defined by the claims.

What is claimed is:

1. A method for setting a frequency priority, comprising:
   receiving, by a user equipment device (UE), at least one service area identity of a service area of a multimedia broadcast multicast service (MBMS) cell broadcast by a base station to which the MBMS cell belongs;
   determining, by the UE, whether the at least one service area identity comprises a service area identity corresponding to an MBMS service that the UE is receiving or is interested in; and
   if the at least one service area identity comprises the service area identity corresponding to the MBMS service that the UE is receiving or is interested in, setting, by the UE, a cell reselection priority of a frequency of the MBMS cell to the highest;
   wherein the service area identity is used for identifying a service area which broadcasts the MBMS service, the service area including multiple multimedia broadcast multicast service single frequency network (MBSFN) areas.

2. The method according to claim 1, wherein the step of setting, by the UE, the cell reselection priority of the frequency of the MBMS cell to the highest is performed when a signal of the MBMS cell is better than a threshold or when the MBMS service is started.

3. The method according to claim 2, wherein when the MBMS cell is a neighboring cell of a serving cell of the UE, the method further comprising:
   receiving, by the UE, an indication indicating that configuration information of a multicast control channel (MCCH) change notification of the MBMS cell is changed wherein the indication is sent by the base station to which the MBMS cell belongs through an interface between the base station to which the MBMS cell belongs and a base station to which the serving cell of the UE belongs; and
   reading, by the UE, the configuration information of the MCCH change notification of the MBMS cell according to the indication indicating that the configuration information of the MCCH change notification of the MBMS cell is changed;
   monitoring, by the UE, the MCCH change notification in a physical downlink control channel (PDCCH) of the MBMS cell according to the configuration information of the MCCH change notification of the MBMS cell; and
   when the MCCH change notification of the MBMS cell is detected, reading, by the UE, the MCCH of the MBMS cell to determine whether the MBMS service starts to be broadcast.

4. The method according to claim 3, wherein the interface between the base station to which the MBMS cell belongs and the base station to which the serving cell of the UE belongs is an X2 interface.

5. The method according to claim 2, wherein when the MBMS cell is a neighboring cell of a serving cell of the UE, the method further comprising:
   obtaining, by the UE, configuration information of a multicast control channel (MCCH) change notification of the MBMS cell broadcast by a base station to which the serving cell belongs;
   monitoring, by the UE, the MCCH change notification of the MBMS cell broadcast in a physical downlink control channel (PDCCH) of the serving cell according to the configuration information of the MCCH change notification of the MBMS cell to determine whether the MCCH of the MBMS cell is changed; and when determining that the MCCH of the MBMS cell is changed, reading, by the UE, the MCCH of the MBMS cell according to the detected MCCH change notification of the MBMS cell to determine whether the MBMS service starts to be broadcast.

6. A user equipment device (UE), comprising: a processor, a receiver coupled to the processor and a memory coupled to the processor; wherein the receiver, configured to receive at least one service area identity of a service area of a multimedia broadcast multicast service (MBMS) cell broadcast by a base station to which the MBMS cell belongs;

the processor, configured to determine whether the at least one service area identity comprises a service area identity of an MBMS service that the UE is receiving or is interested in; and if the at least one service area identity comprises a service area identity corresponding to the MBMS service that the UE is receiving or is interested in, to set a cell reselection priority of a frequency of the MBMS cell to the highest;

wherein the service area identity is used for identifying a service area which broadcasts the MBMS service, the service area including multiple multimedia broadcast multicast service single frequency network (MBSFN) areas.

7. The UE according to claim 6, wherein the processor is configured to set the cell reselection priority of the frequency of the MBMS cell to the highest, comprising:

when a signal of the MBMS cell is better than a threshold or when the MBMS service is started, the processor is configured to set the cell reselection priority of the frequency of the MBMS cell to the highest.

8. The UE according to claim 7, wherein when the MBMS cell is a neighboring cell of a serving cell of the UE, the receiver is further configured to receive an indication indicating that configuration information of an MCCH change notification of the MBMS cell is changed, wherein the indication is sent by the base station to which the MBMS cell belongs through an interface between the base station to which the MBMS cell belongs and a base station to which the serving cell of the UE belongs; and the processor is further configured to read the configuration information of the MCCH change notification of the MBMS cell according to the indication indicating that the configuration information of the MCCH change notification of the MBMS cell is changed; and further configured to monitor an MCCH change notification in a physical downlink control channel (PDCCH) of the MBMS cell according to the configuration information of the MCCH change notification of the MBMS cell; and further configured to read the MCCH of the MBMS cell when the MCCH change notification of the MBMS cell is detected, so as to determine whether the MBMS service starts to be broadcast.

9. The UE according to claim 7, wherein when the MBMS cell is a neighboring cell of a serving cell of the UE, the receiver is further configured to receive configuration information of an MCCH change notification of the MBMS cell broadcast by a base station to which the serving cell of the UE belongs; and the processor is further configured to monitor the MCCH change notification of the MBMS cell broadcast in a physical downlink control channel (PDCCH) of the serving cell according to the configuration information of the MCCH change notification of the MBMS cell, so as to determine whether the MCCH of the MBMS cell is changed; and the processor is further configured to: when determining that the MCCH of the MBMS cell is changed, read the MCCH of the MBMS cell according to the detected MCCH change notification of the MBMS cell, so as to determine whether the MBMS service starts to be broadcast.

10. A base station, comprising: a transmitter and a memory;

wherein the transmitter is configured to broadcast at least one service area identity of a service area of a multimedia broadcast multicast service (MBMS) cell of the base station, wherein the at least one service area identity is used for a user equipment device (UE) to set a cell reselection priority of a frequency of the MBMS cell to the highest, when the UE determines that the at least one service area identity comprises a service area identity corresponding to an MBMS service that the UE is receiving or is interested in after the UE receives the service area identity;

wherein the service area identity is used for identifying a service area which broadcasts the MBMS service, the service area including multiple multimedia broadcast multicast service single frequency network (MBSFN) areas.

11. The base station according to claim 10, wherein when the MBMS cell is a neighboring cell of a serving cell of the UE, the transmitter is further configured to send an indication indicating that configuration information of a multicast control channel (MCCH) change notification of the MBMS cell is changed to a base station to which the serving cell of the UE belongs through an interface between the base station and the base station to which the serving cell of the UE belongs;

so that the UE obtains, through the base station to which the serving cell of the UE belongs, the indication indicating that the configuration information of the MCCH change notification of the MBMS cell is changed, reads the configuration information of the MCCH change notification of the MBMS cell according to the indication indicating that the configuration information of the MCCH change notification of the MBMS cell is changed, and monitors the MCCH change notification in a physical downlink control channel (PDCCH) of the MBMS cell according to the configuration information of the MCCH change notification of the MBMS cell; wherein when the MCCH change notification of the MBMS cell is detected, the UE reads the MCCH of the MBMS cell, to determine whether the MBMS service starts to be broadcast; and when determining that the MBMS service that the UE is receiving or is interested in starts to be broadcast, the UE sets the priority of the frequency of the MBMS cell to the highest for the reselection of the base station to which the cell belongs.

12. The base station according to claim 10, wherein when the MBMS cell is a neighboring cell of the serving cell of the UE, the transmitter is further configured to: send configuration information of a multicast control channel (MCCH) change notification of the MBMS cell and the MCCH change notification of the MBMS cell to a base station to which the serving cell of the UE belongs through an interface between the base station to which the MBMS cell belongs and the base station to which the serving cell of the UE belongs;

so that the UE obtains, through the base station to which the serving cell of the UE belongs, the configuration information of the MCCH change notification of the MBMS cell; monitors the MCCH change notification of the MBMS cell broadcast in a physical downlink control channel (PDCCH) of the serving cell of the UE according to the configuration information of the MCCH change notification of the MBMS cell, to determine whether the MCCH of the MBMS cell is changed; wherein when determining that the MCCH of the MBMS cell is changed, the UE reads the MCCH of the MBMS cell according to the detected MCCH change notification of the MBMS cell, to determine whether the MBMS service starts to be broadcast; and when determining that the MBMS service that the UE is receiving or is interested in starts to be broadcast, the UE sets a cell reselection priority of a frequency of the MBMS cell to the highest.

13. The base station according to claim 12, wherein the interface between the base station to which the MBMS cell belongs and the base station to which the serving cell of the UE belongs is an X2 interface.

\* \* \* \* \*